Oct. 30, 1951  F. NOE  2,573,159

JOURNAL BEARING

Filed March 10, 1949

INVENTOR
FRANK NOE
BY
Mithure Behert
ATTORNEYS

Patented Oct. 30, 1951

2,573,159

UNITED STATES PATENT OFFICE 2,573,159

JOURNAL BEARING

Frank Noe, Plainville, Conn., assignor to The Fafnir Bearing Company, New Britain, Conn., a corporation of Connecticut Application March 10, 1949, Serial No. 80,622

3 Claims. (Cl. 308—180)

My invention relates to an antifriction-bearing housing, and in particular to a bearing housing to be supported between pedestal-type guides, as in the case of a passenger-car railway bearing.

It is, accordingly, an object of my invention to provide an improved bearing construction of the character indicated.

It is also an object to provide an improved load distributing means in a bearing of the character indicated.

It is a general object to achieve the above objects with a light, yet strong, inexpensive and readily fabricated construction.

Figure 1:
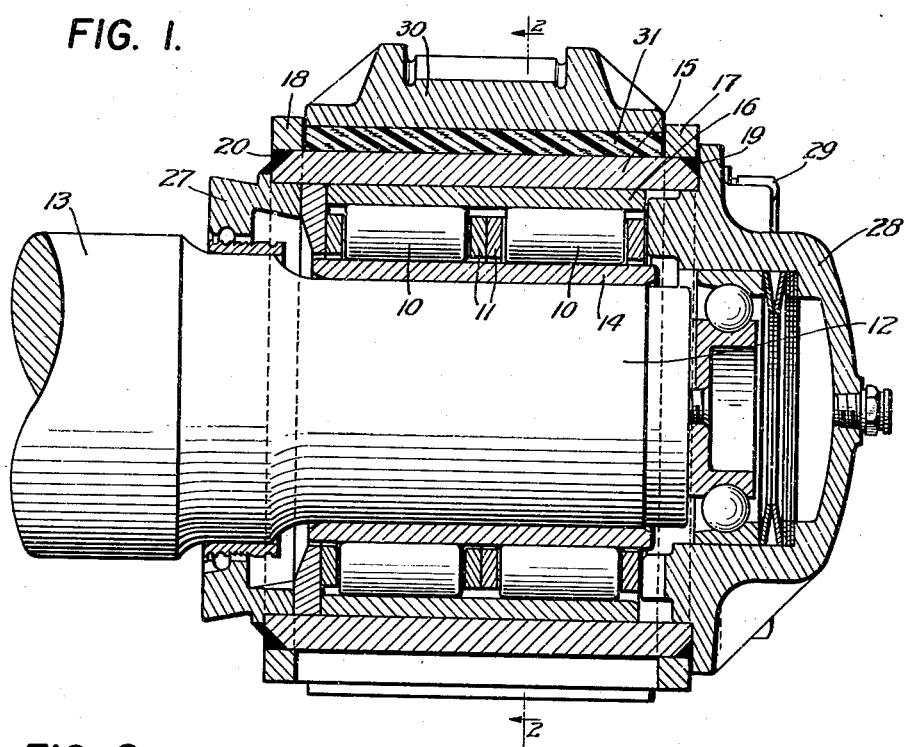
Figure 2:
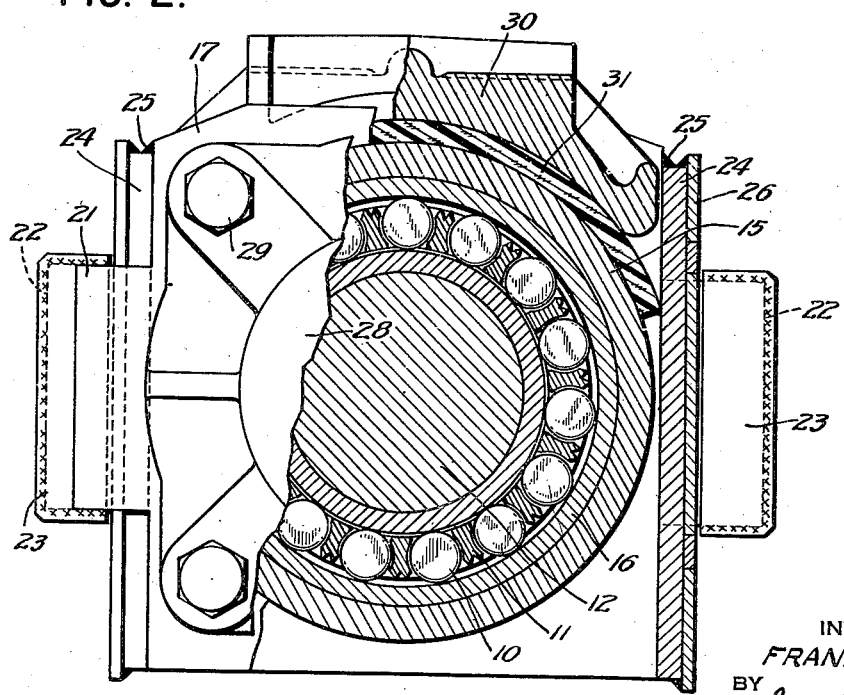

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a vertical sectional view through a railway-type bearing incorporating features of the invention and shown supporting a railway axle; and Fig. 2 is an end view of the bearing of Fig. 1, shown partly in section more or less in the plane 2—2 of Fig. 1.

Briefly stated, my invention contemplates an improved load-distribution means as applied to a bearing-housing construction that may be built around a generally longitudinally extending sleeve. End plates may have openings to fit over and axially to overlap spaced parts of the sleeve, and these end plates may be secured to the sleeve, as by welding. Side plates on opposite sides of the sleeve may extend between the end plates and may be welded to said end plates. In order to sustain the radial load on the bearing an equalizer or saddle may be formed as a separate member to straddle a longitudinally extensive arcuate area of the sleeve. In the preferred form to be described, the equalizer is formed with a cylindrical load-sustaining surface to be spaced more or less uniformly from the outer surface of the sleeve by a layer of insulating material.

Referring to the drawings, my invention is shown in application to a railway bearing of the passenger-car type, wherein the bearing may float and be vertically guided between pedestal shears and wherein the radial load may be sustained on an equalizer or saddle. The bearing may include a plurality of rollers or antifriction elements, such as rollers 10, angularly spaced and retained, as by retainer means 11. The antifriction elements 10 may ride directly upon the journaled end 12 of a railway axle 13, or a separate cylindrical sleeve 14 may ride upon the said journal end 12 and have a suitably finished outer surface to serve as the inner raceway for the antifriction elements 10. The outer raceway may be provided by a second sleeve 15 forming part of the bearing housing; but, in the form shown, I employ an additional sleeve 16 within the housing sleeve 15 to serve as the outer bearing ring. The sleeve 15 may be of sheet material rolled to shape and welded along a longitudinal seam that is preferably on the underside of the assembly; alternatively, the sleeve 15 may be of tubular stock, as shown.

The bearing housing which is built around the sleeve member 15 may include spaced end plates 17—18 welded, as at 19—20, to the sleeve 15 so as to form radially outwardly extending flanged ends on the sleeve. Both end plates 17—18 may be formed with lateral projections, such as 21 for the plate 17 (and 22 for the plate 18), to be guided by the shears; if desired, wear plates 23 may be welded on the projections 22. The housing assembly may be completed by side-wall members 24 having projections to interlockingly engage the projections 21—22 and welded, as at 25, to the end plates 17—18. Again, wear plates, such as the plate 26, may be welded to the side-plate members 24. For axial-locating purposes, a ring member 27 may be welded at the inner end of the housing assembly, and, if desired, the ring 27 may include dirt-and-water seal means, as shown. At the outer end, a removable cover member 28 may be secured by bolts 29 to the welded housing assembly. The parts which have thus far been described are discussed in further detail in my copending application Serial No. 60,550 filed November 17, 1948, now Patent No. 2,560,183, granted July 10, 1951.

In accordance with a feature of the invention, I provide an improved structure for sustaining and distributing the overall radial load on the bearing and bearing housing as a unit. Such improved means may include an equalizer or saddle 30 having a part to ride preferably with slight end clearance between the end plates or flange members 17—18. The equalizer means 30 may include a lower concave surface overstanding a substantial arcuate area of the sleeve member 15, and the equalizer means 30 is preferably entirely separate from and movable with respect to the sleeve 15. The equalizer 30 may be resiliently spaced from the sleeve 15, and in the form shown I have employed a more or less uniformly thick pad 31 of insulating material which may be of fabric, rubber, or of a composition known to the trade as Fabreeka. The cylindrical surface of the equalizer 30 is preferably substantially equally spaced at all points from the outer surface of the sleeve 15 and may thus be formed of a slightly larger radius about the axle center than the outer radius of the sleeve 15.

It will be seen that I have described a relatively simple load-equalizing means for an antifriction bearing assembly. By utilizing a cylindrical surface of the bearing assembly rather than a flat or substantially flat projection of such surface, it is possible to sustain the total radial load of the bearing over a larger area than previously. Since the load is better distributed over a larger area, localized stresses will be minimized, and the length of life of the insulating material and of other parts of the bearing may be prolonged.

While I have described my invention in detail for the preferred form shown, it will be understood that modifications may be made within the scope of the invention as defined in the appended claims.

I claim:

1. In an antifriction-bearing housing of the character indicated, a longitudinally extending cylindrical sleeve to receive radial antifriction-bearing loads on the inside thereof, end-flange means extending generally radially of both ends of said sleeve, side plates extending between said end-flange means, and a generally arcuately formed equalizer straddling a substantial cylindrically arcuate outer portion of said sleeve and guided between said side plates and said end-flange means, said equalizer being separate from said sleeve.

2. In an antifriction-bearing housing of the character indicated, longitudinally extending cylindrical sleeve means to receive radial antifriction-bearing loads from within, side plates and end-flange means for said sleeve leaving the upper surface of said sleeve exposed, an equalizer extending longitudinally and over an arcuate exposed portion of said sleeve, and a layer of insulating material including an arcuate surface in contact with said sleeve and located between said sleeve and said equalizer.

3. In combination, an antifriction bearing comprising a generally cylindrical inner race member, antifriction elements, a generally cylindrical sleeve around said elements, an equalizer having a concave arcuate surface of substantially the same curvature as the outer surface of said sleeve, and an insulating layer of resilient material between said equalizer and said sleeve, side plates and end-flange means for said sleeve and serving as guiding and retaining means for said equalizer.

FRANK NOE.

REFERENCES CITED

The following references are of record in the file of this patent:

UNITED STATES PATENTS

| Number | Name | Date |
|---|---|---|
| 904,104 | Watson | Nov. 17, 1908 |
| 2,054,228 | Oelkers et al. | Sept. 15, 1936 |
| 2,133,024 | Gibbons et al. | Oct. 11, 1938 |
| 2,267,466 | Janeway | Dec. 23, 1941 |